Feb. 6, 1940.  R. M. HICKS ET AL  2,189,581
INDICATING DEVICE
Filed Feb. 2, 1935
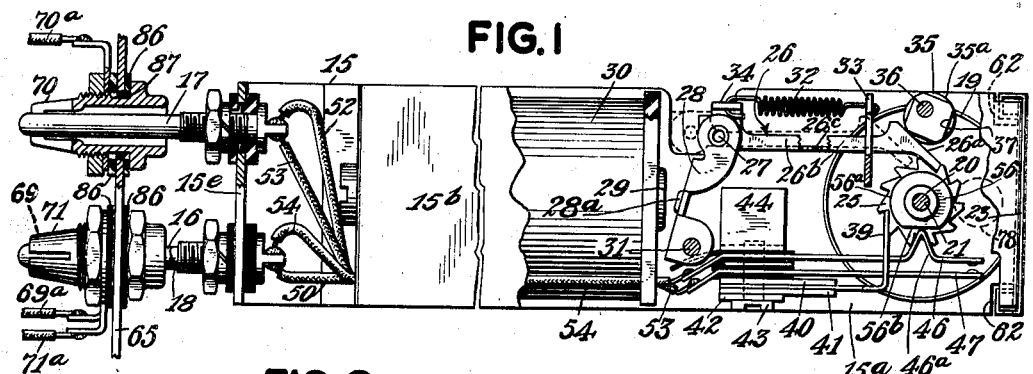
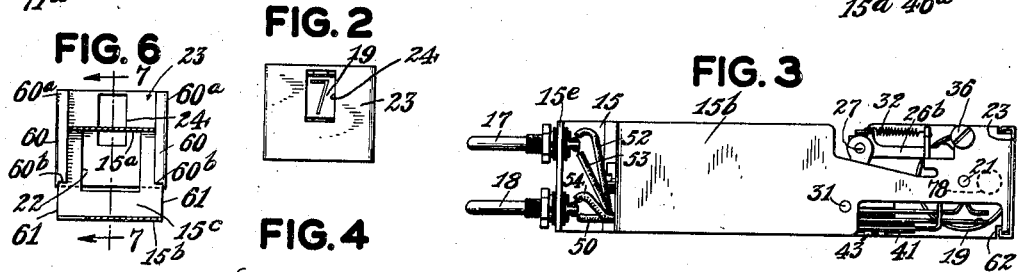
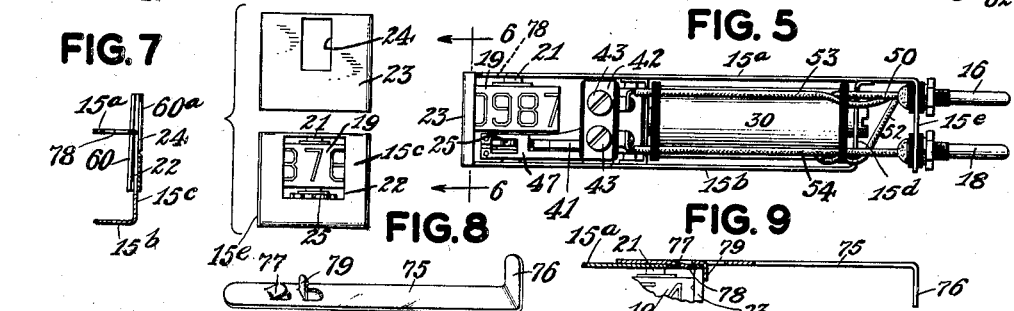
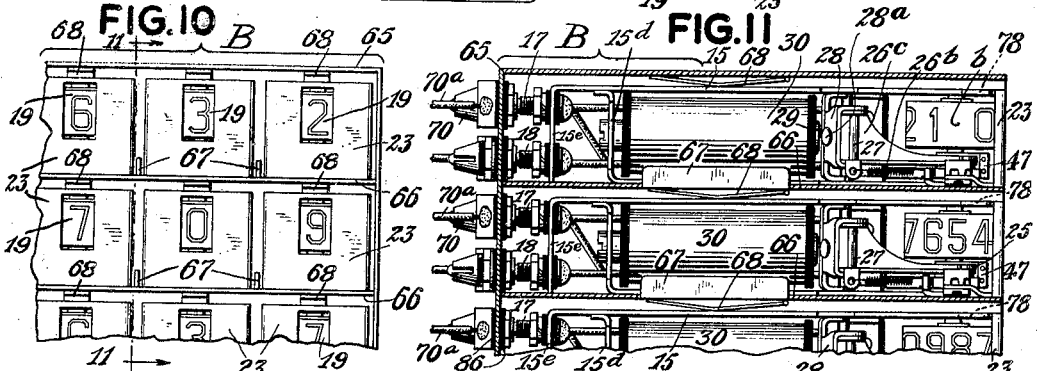
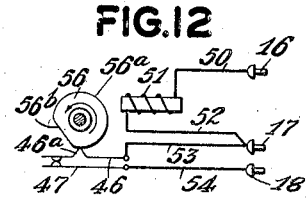
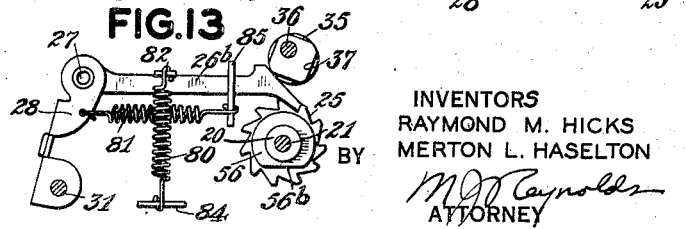
INVENTORS
RAYMOND M. HICKS
MERTON L. HASELTON
BY
ATTORNEY Patented Feb. 6, 1940

2,189,581

UNITED STATES PATENT OFFICE 2,189,581

INDICATING DEVICE

Raymond M. Hicks, Plainfield, N. J., and Merton L. Haselton, Rye, N. Y., assignors to The Teleregister Corporation, New York, N. Y., a corporation of Delaware Application February 2, 1935, Serial No. 4,636

6 Claims. (Cl. 177—328)

Our invention relates generally to an electroresponsive device for selectively actuating a member to different positions as determined by electrical pulses transmitted to the device, and particularly to an electromagnet indicator for selectively displaying different digits or other devices or indicia in accordance with the number of electrical pulses of predetermined character caused to flow through the actuating winding of the electromagnet.

In certain stock market quotation systems, a number of subscribers' stations each is provided with stock designation indicators and "open," "high," "low" and "last" price indicators, together with dialing mechanism or the like by means of which the subscriber may request from a central transmitting station the prices of any stock, the central station including mechanism whereby the stock designation and the prices relating to such stock may be set up, together with means for transmitting a series of electrical pulses to the various indicators at the subscriber's station to set up thereon digits corresponding to the designation and prices of the stock requested.

The indicators heretofore employed for this purpose are generally unsuitable because, among other reasons, their operating speed is too low; they are not sufficiently reliable in operation; the units are too large in size to make a compact arrangement at the subscriber's station; and the necessary operating current is so large that a local battery or other source of power supply for actuating the indicators occasionally is required at the subscriber's station.

One object of the invention is to obviate the foregoing disadvantages and provide an indicator having a higher operating speed and greater accuracy and reliability in operation, which requires only a relatively small operating current so that a local source of power may be dispensed with, and which may be made compact and small in size.

Another object is to provide a more suitable counting, stepping and/or indicating device for any purpose, having various of the advantages disclosed herein, which is simple in construction and adapted to quantity production methods and may therefore be produced at a relatively low cost.

A further object is to provide a device of the character stated which may readily be inserted and removed from a bank of such units for inspection, adjustment, replacement or repair, without disturbing the other units of the bank or the electrical connections thereto.

With these and other objects in view, which will become apparent from the following description of one illustrative embodiment of the invention shown in the accompanying drawing, the invention resides in the novel elements of construction, devices and combination of parts in cooperative relationship, as hereinafter more particularly pointed out in the claims.

In the drawing:

Fig. 1 is an enlarged detail view of an electromagnetic indicator constructed in accordance with the invention, showing the indicator in operative position as it appears from the bottom thereof looking upwardly, certain parts being broken away and others shown in section, more clearly to disclose the construction thereof;

Fig. 2 is a front view, in elevation, of the indicator, showing the same on a scale which when the drawing is reduced to patent size, will show the indicator approximately two-thirds actual size;

Fig. 3 is a bottom view looking upwardly, of the indicator shown in Fig. 2;

Fig. 4 is a front view of the indicator with the indicia mask removed;

Fig. 5 is a right hand side view, in elevation, of Fig. 2;

Fig. 6 is a view, taken substantially along the line 6—6 of Fig. 5, showing details of the indicia mask and its supporting structure, with the mask partially removed;

Fig. 7 is a view taken along the line 7—7 of Fig. 6;

Figs. 8 and 9 are views of a tool for removing an indicator from its bank, Fig. 9 showing the tool in operative position;

Fig. 10 is a partial front view, in elevation, of a bank of stock designation indicators comprising a subscriber's station;

Fig. 11 is a sectional view taken along the line 11—11 of Fig. 10;

Fig. 12 is a schematic diagram of the actuating circuit for the electromagnet of each indicator; and Fig. 13 shows a modified arrangement of springs for biasing the actuating pawl of the indicator.

Referring particularly to Figs. 1 to 5, the indicator unit comprises a rectangular casing or frame member preferably composed of an integral strip 15 of sheet metal bent to form two oppositely disposed parallel portions 15a, 15b, forming respectively the top and bottom of the casing, Fig. 5, and two portions 15c, Fig. 4, and 15d, Fig. 5, forming respectively the front and rear ends of the casing, and between which various elements of the unit are mounted, the casing thus formed serving to protect the fragile elements of the unit against breakage or damage when the unit is removed from its bank or other supporting structure for inspection, adjustment, replacement or repair. An end 15e of the strip 15 is bent as shown to form a terminal plate carrying three electrical terminals 16, 17, 18, preferably in the form of plugs, for connecting the unit with its external operating circuit.

At the front end of the casing is a drum 19, Fig. 1, secured to a sleeve bearing 20 rotatably mounted on a pin 21 secured at its ends in any suitable manner, as by peening, to the top and bottom 15a, 15b of the frame. The drum carries a plurality of elements or devices which in the embodiment illustrated comprise characters or other indicia, for example, the ten digits 1, 2, 3, 4, 5, 6, 7, 8, 9, 0 and a blank space b Figs. 10 and 11 which may be selectively positioned adjacent to an opening 22, Fig. 4, in the front end 15c of the casing to display the desired information in regard to the stock designation or the price of the stock requested. To prevent confusion as to which digit is intended to be displayed, and to provide a suitable background and sharp border line for framing the digit, a mask 23 is positioned closely adjacent to the end 15c, the mask having an opening 24 therein thru which the digit is displayed. Preferably, and as shown, the mask is made from thin sheet metal so that the digit or other character displayed will lie close to the front face of the mask and thus enable the character to be seen by those who are not directly in front of the indicator.

Fig. 1, which is an enlarged detail view of the indicator as it appears from the bottom looking upwardly, shows the means and mechanism for stepping the drum 19 around to the desired positions. Connected to the sleeve 20 is a ratchet wheel 25 having, in the specific embodiment illustrated, eleven teeth on the periphery thereof corresponding respectively to the above mentioned ten digits and blank space b on the drum. Associated with the ratchet is a pawl 26 which engages, at its forward end, the ratchet teeth to step the drum around. The rear end of the pawl is pivotally connected at 27 to the free end of an armature 28 positioned opposite the core or pole piece 29 of an electro-magnet 30, the armature being pivotally mounted on a pin 31 secured at its ends to the portions 15a, 15b of the frame. A contractile spring 32, anchored at one end to a lug 33 secured to the frame 15, and secured at its other end to an ear 34 extending from the pawl 26, normally urges the pawl in a direction to step the ratchet around, i. e., to the position shown in Fig. 1.

Energization of the electromagnet 30 by an electrical impulse from the central transmitting station hereinbefore referred to, attracts the free end of the armature to the core 29 thus retracting the pawl 26 (moving it to the left to the dotted line position shown in Fig. 1) and causing it to engage the next succeeding tooth of the ratchet wheel 25. Upon deenergization of the electromagnet, the armature is no longer attracted by the core 29, and the contractile spring 32 again moves the pawl 26 to the position shown in Fig. 1. Successive impulses impressed upon the operating winding of the electromagnet result in stepping the drum around, in a clockwise direction as viewed in the figure, a variable number of steps depending upon the number of impulses sent out by the transmitting station, and in this manner causing a selected digit to be displayed through the opening 24 in the mask 23 as shown in Figs. 2 and 10.

Referring again to Fig. 1, it will be seen that the travel of the pawl from its retracted position, shown in dotted outline, to its forward position, shown in full line, is substantially along a straight line tangent to the periphery of the ratchet wheel 25 and substantially coincides with the direct line of action or thrust of the pawl when actuated by the spring 32. In this arrangement the amount of force required to overcome the inertia of the drum 19 and to rotate the device is reduced to a minimum because practically all the force exerted on the pawl by the actuating spring 32 is applied to the ratchet wheel at a point and in a direction to produce the greatest moment of force tending to rotate the wheel. Thus, a relatively weak spring will ensure positive operation of the indicator, and since a relatively small operating current only is required to overcome a weak spring and attract the armature 28, the indicator may be operated directly, over long distances or high impedance conductors, by the usual signals or impulses sent out by the transmitting station, and does not require a repeater or relay, or a source of local power supply for actuating the indicator.

Furthermore, when a stepping impulse is impressed upon the actuating winding of the electromagnet, the armature 28 is farthest away from the core or pole piece 29, and since the pull upon the armature is inversely proportional to the square of the distance between the armature and the pole piece, the pull on the armature is substantially least at this time; this is compensated for, however, by the fact that the tension exerted by the spring 32 is least at this time. As the armature is attracted towards the pole piece, the tension exerted by the spring increases but the pull upon the armature likewise increases. When the electromagnet is deenergized, there is a time interval in which the decaying flux tends to hold the armature against the pole piece, but at this time the tension exerted by the spring 32 is greatest and thus the attractive effect of the decaying flux is overcome.

The foregoing construction insures a quick positive action of the pawl 26 in either direction of travel. For example, the indicator illustrated herein may, with a 220 ohm winding for the operating coil of the electromagnet, be made in a size suitable for use in subscribers' stations in a stock market quotation system with a speed of at least 25 to 30 stepping operations per second, and require but 0.185 of an ampere operating current which is well below the current strength of the signals sent out by transmitters in conventional stock quotation systems.

It is highly important, particularly in stock quotation indicators, to accurately align or position the selected digit 0, 1, 2, etc., relative to the opening 24 of the mask 23 of the indicator when such digit is in operative relation therewith, and to accomplish this there is provided a stop member 35 having a curved or rounded surface 35a adapted to abut the tapered surface 26a of the pawl 26, the stop member being eccentrically mounted on a screw 36 and adjustable about this mounting. The screw 36 passes through the bottom portion 15b of the frame and clamps the stop member 35 in any of its adjusted positions, the eccentric mounting of the stop member providing means for obtaining very fine adjustments of the stop member, the latter having flat portions 37 for receiving an adjusting tool or a pair of pliers for turning the eccentric stop member to any desired position. The eccentric stop, in addition to its function of accurately limiting the forward travel of the pawl, also operates at the end of the forward travel of the pawl to jam or wedge the forward end of the pawl against the teeth of the ratchet 25, and thus prevents overtravel of the ratchet and drum assembly and keeps the drum 19 and the selected digit in proper aligned position until normalizing or resetting impulses are received by the electromagnet.

A back stop or ratchet spring 39 engages the teeth of the ratchet wheel 25 and prevents reverse rotation of the wheel and drum 19, the ratchet spring being adjusted so that it falls behind a tooth of the ratchet wheel just as the pawl 26 reaches the forward limit of its travel as determined by the eccentric stop member 35. Preferably, and as shown, the ratchet spring is mounted between metal positioning leaves or strips 40 and 41 on opposite sides thereof, and this assembly is firmly clamped, by a plate 42 and screws 43, which thread into a bracket 44, to a contact assembly or pile-up comprising contact springs 46, 47 hereinafter described, the various members 39 to 44 being electrically insulated from the contact assembly, as indicated. Bracket 44 is rigidly secured to the frame members 15a and 15b in any suitable manner, as by riveting or welding. The metal positioning leaves 40 and 41 maintain the ratchet spring 39 in proper position with regard to ratchet wheel 25, and also provide a simple and efficient means for adjusting the position of the ratchet spring, initially and to compensate for wear or permit any desired change in adjustment in service, the leaves being readily bendable by an adjusting tool or a pair of pliers to adjust the position of the spring 39 relative to the ratchet wheel. The leaves are made of material of sufficient gauge or thickness to hold any position to which they are adjusted, and thus there are no adjusting screws or other similar parts which may work loose in service.

When the device is used as an indicator in stock quotation or other systems for indicating the price or other information in regard to a requested stock or other item, frequently it is desirable or necessary to restore the indicator to its starting or blank position b before setting up a new price or new information regarding the same or a different item, and to accomplish this, restoration or normalizing pulses are sent out either by the transmitter or by locally generated impulse means prior to sending the pulses corresponding to the current information requested. Where ten digits are employed as the devices for giving the desired information, the ratchet 25 has eleven teeth, ten of which position the ten digits, respectively, the remaining tooth corresponding to the blank or starting point b of the drum 19. It will be appreciated that if ten restoration or normalizing pulses are sent out by the transmitter, this will restore the drum 19 to its blank position from any position to which it previously had been actuated, but it will also be appreciated that some means must be provided for causing the drum to stop when the blank position b is in alignment with the opening 24 of the mask 23.

To accomplish this the operating circuit, more clearly seen in Fig. 12, may be traced as incoming to terminal 16, conductor 50, winding 51 of the electromagnet, conductor 52 to common terminal 17, thence through conductor 53 to contact springs 46 and 47, and return by way of conductor 54 to terminal 18. There is secured to the sleeve 20 a cam member 56 having a rounded portion 56a which bears upon a cam follower portion 46a of contact spring 46 and maintains the contacts 46 and 47 in closed circuit position when any of the digits is displayed. The cam has a flat portion 56b which co-acts with the spring 46 which is so tensioned that it tends to spring away from contact 47 and open the circuit, the cam 56 being adjusted relative to drum 19 so that when the blank position b of the drum 19 is opposite the opening 24 in mask 23, the flat portion 56b of cam 56 will be opposite the portion 46a of spring 46, thus permitting spring 46 to open the operating circuit. As the ten restoration impulses are sent in, the indicator will be stepped forwardly until the flat portion 56b of the cam is opposite the follower portion 46a of spring 46, thus opening the circuit at springs 46 and 47, at which time the indicator is in the blank position and will remain in this position unaffected by the remaining restoration impulses received.

When the drum is in its blank or starting position, the contact springs 46 and 47 are open, but, as is well known in the art, an actuating or starting impulse may be sent from the external circuit to terminal 16, conductor 50, winding 51, and return through conductor 52 and terminal 17, independent of contacts 46 and 47, and thus actuate the drum from a starting position; after the drum has been stepped forward one step by the starting pulse, the round surface 56a of the cam 56 again engages the follower 46a and moves spring 46 so that it again makes contact with spring 47 to close the restoration circuit. The method of thus controlling the indicator drum by the electrical circuits described is well known in the art, and therefore the external circuits employed are not explained in detail here. To insure good electrical contact between contact springs 46 and 47, each of these springs may have two contact portions or points, as shown in Fig. 5.

In order to provide a strong construction for the pawl 26, and at the same time make it light in weight, the pawl at its rear end where it is pivotally connected at 27 to the armature 28, is provided with a wide web portion 26c (see Fig. 11) substantially the width of the armature 28, the pawl progressively decreasing in width so that where it reaches its forward end it is relatively narrow, as shown. Also, to further strengthen the pawl, without substantially increasing its weight, there is provided a flange 26b, Figs. 1, 3 and 11, which strengthens the pawl in its direction of thrust and also provides the tapered edge portion 26a which coacts with the stop member 35 in the manner hereinbefore described.

In order to simplify the construction and reduce the number of screws or other fastening means required for securing the various parts of the indicator together, the mask 23 (see Figs. 6 and 7) is provided with flanged portions 60 which engage the edges 61 of the front portion 15c of the frame, the flanged portions of the mask passing through notches 62, 62, Figs. 1 and 3, in the top portion 15a of the frame. As indicated in Fig. 7, the flanged portions 60 each taper at the upper end 60a thereof, so that as the mask is pushed downwardly into place it is firmly wedged into engagement with the front portion 15c of the frame, thus firmly securing the mask in place and yet permitting ready removal of the mask by raising the same upwardly, whenever desired. The downward limit of travel of the mask is determined by the lower edges, Fig. 6, of the flanged portions of the mask which engage the bottom 15b of the frame, these edges being cut away as shown at 60b to enable the mask to seat flush with the top and bottom 15a and 15b of the frame.

Referring to Figs. 10 and 11, there is shown a part of a bank B of indicators of the foregoing type assembled within a casing 65, the casing being divided into sections by transverse supporting plates 66. Upstanding flanged portions 67 extending from the plates 66 serve to laterally position the indicator units, the units being firmly wedged into engagement with the supporting frame work 65, 66 by bowed springs 68 secured at one end, as by welding, to the frame structure, and having the other end free, the tension exerted by the springs being sufficient to firmly hold the indicator units in place, while permitting the units to be slid outwardly and inwardly for removing and replacing them in position. Preferably, and as shown, the terminals 17, 18 and 19 of each unit are adapted to be slid into complementary slotted spring terminals, such as 69, 70 and 71, supported by the back wall of the casing 65 and insulated from the wall by washers 86 and a split bushing 87 composed of fiber, Bakelite or other suitable insulating material. Leads 69a, 70a and 71a, Fig. 1, connect the slotted terminals 69, 70 and 71 to the external circuit. With this construction the units may readily be removed for inspection, replacement or repair purposes.

Figs. 8 and 9 show one form of a tool for removing the indicator units from the bank B. As shown in Fig. 8, the tool comprises a metal strip 75 having one end 76 bent to provide a handle, the tool having at its other end a tongue 77 which, when the tool is inserted in the manner shown in Fig. 9, enters an aperture 78 in the upper portion 15a of the unit. When the tool is inserted between the upper part of the unit and the adjacent part 65 or 66 of the casing, the tongue 77 is caused to enter the aperture 78 and provides means for pulling the unit from the bank. A lug 79, pressed outwardly from the strip 75, serves as a stop for the tool to prevent its being pushed in too far, and also provides means for readily positioning the tongue 77 with respect to the aperture 78.

Fig. 13 shows an alternative form of spring means for actuating the pawl 26 and biasing it into engagement with the ratchet wheel 25, the arrangement utilizing two springs 80 and 81; spring 80 being anchored at one of its ends 82 to the pawl, and at its other end to a stud 84 secured to the frame 15, this spring holding the pawl in firm engagement with the ratchet wheel. Spring 81 is anchored at one end to a lug 85 secured to the frame 15, and at its other end is secured to the armature 28. The two springs function generally in the manner of spring 32 hereinbefore described.

Preferably, although not necessarily, the lug 33 associated with spring 32, and lugs 84 and 85 associated with springs 80 and 81, comprise bendable metal tabs, which may be integral with the frame 15 if desired; the tabs being readily bendable by pliers or other means to adjust the tension exerted by the respective springs.

To prevent possibility of the armature 28 coming into contact with the core or pole piece 29 of the magnet 30, Fig. 1, there is provided a small projecting element 28a of non-magnetic material which engages the pole piece when the armature is attracted thereto, and insures clearance between the ferric portion of the armature and the pole piece to maintain a suitable gap therebetween, so that the armature will start to release substantially coincident with interruption of the electromagnet energizing circuit and thus enable a high speed of operation of the unit to be attained. Also, the drum 19 preferably is made from aluminum or other light weight material to reduce the inertia thereof and thus facilitate quick operation of the unit, and minimize wear on the sleeve bearing 20 and the driving mechanism for the drum.

While there is shown and described herein a certain preferred embodiment of the invention, many other and varied forms and uses will present themselves to those versed in the art without departing from the invention, and the invention, therefore, is not limited either in structure or in use except as indicated by the terms and scope of the appended claims.

We claim:

1. An indicator unit comprising a first member having a number of different characters thereon, a second member having an opening therein through which said characters are displayed, a ratchet and a pawl for rotating said first member to different positions to display a selected character through the opening of the second member, means including an electromagnet for actuating said pawl in a direction to step the ratchet around in one direction, a ratchet spring for preventing reverse rotation of the ratchet, and a member operative on the ratchet spring and readily bendable in a direction to adjust the position of the spring relative to the rest position of the ratchet for maintaining the spring in any of its said adjusted positions.

2. An indicator unit comprising a first member having a number of different characters thereon, a second member having an opening therein through which said characters are displayed, a ratchet and a pawl for rotating said first member to different positions to display a selected character through the opening in the second member, means including an electromagnet for actuating said pawl to step the ratchet and said first member around in one direction, an electrical contact assembly for controlling the actuating circuit of the electromagnet, a ratchet spring secured to said contact assembly, said ratchet spring preventing reverse rotation of the ratchet and said first member, and metal leaves operative on either side of said ratchet spring and readily bendable in a direction to adjust the position of the spring relative to the rest position of the ratchet for maintaining the spring in any of its said adjusted positions.

3. Means for actuating an indicator unit having a member with a plurality of different characters thereon, the member being movable to different positions to selectively display said characters, said means comprising ratchet and pawl structure for stepping the movable member to said different positions, an electromagnet and an armature in operative relation therewith, said pawl being pivotally connected at one end thereof to said armature and actuated thereby, said pawl being relatively wide at its pivoted end and relatively narrow and tapered at its end engaging the ratchet, the pawl having a flange portion extending along the length thereof to stiffen the same in the direction of thrust of the pawl, said tapered portion of the pawl being formed from said flanged portion.

4. An indicator unit comprising a drum having a number of different characters thereon, the drum being rotatable to different positions to selectively display said characters, ratchet and pawl structure for rotating the drum, means including an electromagnet for actuating said ratchet and pawl structure to step the drum around to a desired position, electrical terminal members for connecting the indicator unit to an external circuit, and a frame member carrying the foregoing elements, said frame member comprising a strip of sheet material bent to form two oppositely disposed generally parallel sides and an end of the indicator unit, said end portion having an opening therein through which said characters are displayed, said frame member also having a portion thereof bent to provide a support for said electrical terminal members.

5. An indicator unit comprising a drum having a number of different characters thereon, the drum being rotatable to different positions to selectively display said characters, a mask for masking the drum and having an opening forming a frame through which said characters are selectively displayed, a frame member having edge portions for supporting said mask, said mask having flanged portions which slidably engage said edge portions of the frame member, the flanged portions each tapering at one end thereof in such manner that as the mask is slid into operative position the tapered flanged portions releasably wedge the mask into firm engagement with said edge portions of the frame member.

6. An indicator unit comprising a drum having a number of different characters thereon, the drum being rotatable to different positions to selectively display said characters, a ratchet wheel and a reciprocable pawl associated therewith for rotating the drum, spring means normally urging the pawl in a direction to step the ratchet wheel around, an abutment for limiting the travel of the pawl under the urge of the spring means when stepping the drum to a new position, an electromagnet and an armature in operative relation therewith, means connecting the armature with the reciprocable pawl in such manner that movement of the armature due to energization of the electromagnet retracts the pawl against the tension of said spring means, and a frame member carrying the foregoing elements, said frame member comprising a strip of sheet material bent to form two oppositely disposed generally parallel sides and the opposite ends of the indicator unit.

RAYMOND M. HICKS.
MERTON L. HASELTON.